UNITED STATES PATENT OFFICE.

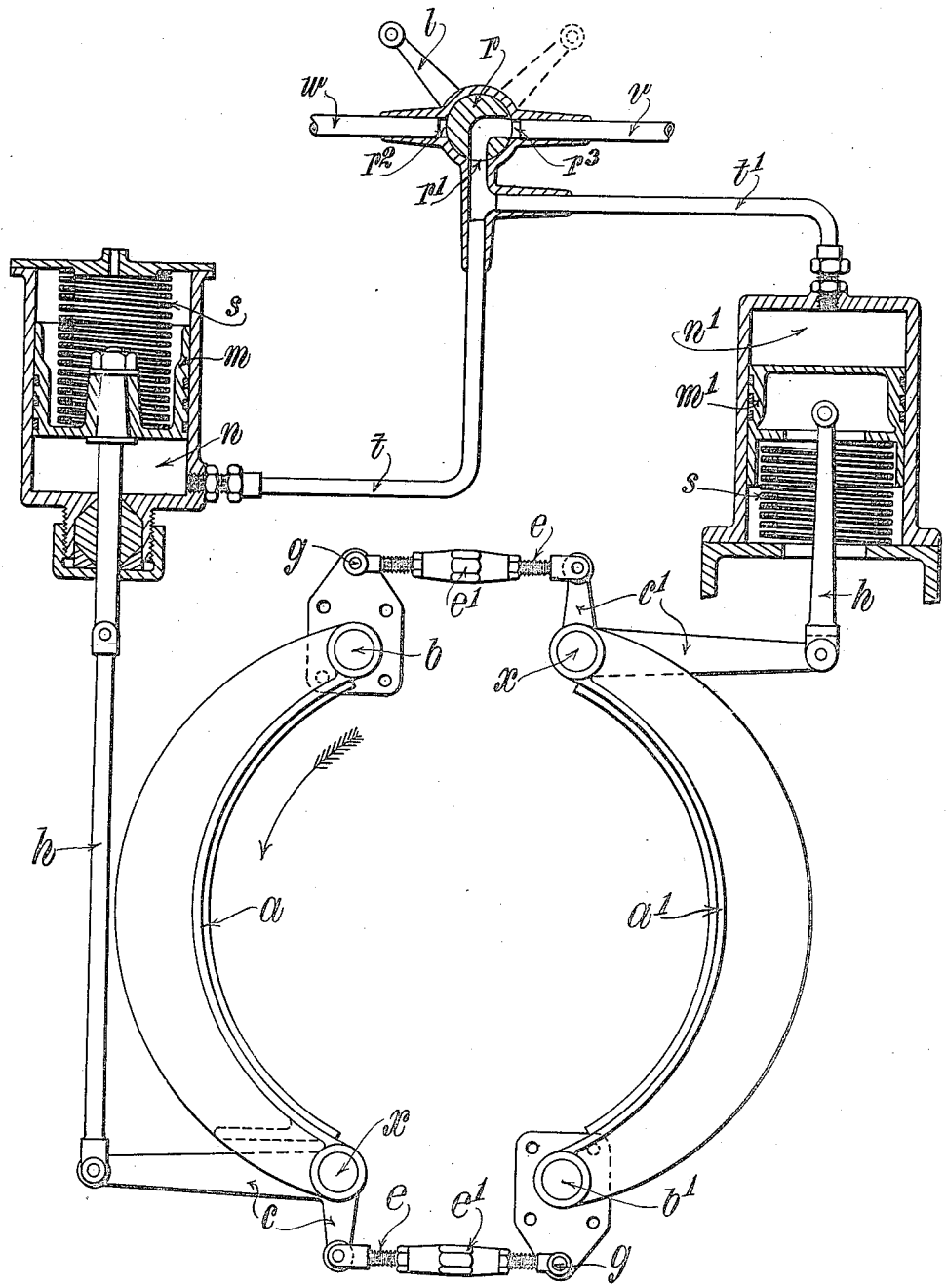

FREDERICK HENRY ROYCE, OF DERBY, ENGLAND.

BRAKE MECHANISM.

1,210,846.　　　　　Specification of Letters Patent.　　Patented Jan. 2, 1917.

Application filed June 6, 1914. Serial No. 843,554.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in and Relating to Brake Mechanisms, of which the following is a specification.

This invention relates to friction brake mechanism of the external contracting shoe type, and has for its object to obtain equal brake-shoe pressure, equal reaction due to braking effect, and to maintain these conditions after wear of the parts.

A further object of the invention is to operate the brake mechanism by means of fluid pressure and thus permit of a very simple form of control.

The usual type of brake mechanisms have one or the other of the following disadvantages inherent from their construction:— (1) The side pressure which is imposed on the brake drum caused by the pressure of the brake shoes is not balanced, and (2) reaction due to brake effect caused by the brake shoes being so mounted that the revolving brake drum tends to drag one shoe on while simultaneously thrusting the other and opposite shoe off. Although some brake mechanisms when first assembled are free from these defects, they soon develop them after wear has taken place on the brake shoes and the relative positions of the moving parts have become changed.

According to the present invention, the fulcrums of the brake shoes are arranged diametrically opposite to each other, as are also the free ends of said brake shoes, the leverage operating the shoes is made exactly equal, and the brake shoes are operated by means of fluid pressure by suitably connecting them up to movable pistons or the like working in separate cylinders, the construction and arrangement being such that both pistons are subject to the same pressure applied at the same time.

Referring to the accompanying drawing which illustrates diagrammatically a brake mechanism constructed in accordance with the present invention, the brake shoes $a$ and $a^1$ are pivoted on fixed pins $b$ and $b^1$ which are located diametrically opposite to each other and the length of said shoes is such that their free ends are also diametrically opposed to each other. On the free ends of the brake shoes $a$ and $a^1$—which are contiguous to the fixed pins $b$ and $b^1$—are pivoted (by means of pins $x$) bell-crank levers $c$ and $c^1$ which for convenience have their limbs of unequal length as shown. The shorter limb of each of the levers $c$ and $c^1$ is coupled to a fixed pin $g$ by an adjustable link $e$, said pin being mounted in suitable juxtaposition to the pins $b$ and $b^1$ on which the brake shoes $a$ and $a^1$ are mounted.

It will be understood that both of the shorter limbs and both of the longer limbs of the levers $c$ and $c^1$ are of equal length.

The ends of the longer limbs of the bell-crank levers $c$ and $c^1$ are connected by suitable coupling rods $h$ to pistons $m$ and $m^1$ working in cylinders $n$ and $n^1$, the construction and arrangement of said pistons and cylinders being such that pressure acting on the pistons moves them in opposite directions, said pressure working against springs $s$ adapted to operate to hold the brake shoes clear of the brake drum when the pressure is removed.

The admission and release of the fluid pressure to and from the cylinders is effected by any suitable device, that shown being a simple and convenient one. It consists of a three-way valve $r$, one port $r^1$ of which is in communication by means of pipes $t$ and $t^1$ with the opposite ends of the cylinders $n$ and $n^1$, the other two ports $r^3$ and $r^2$ of the valve $r$ being connected to the pressure pipe $v$ and the release pipe $w$ respectively. On movement of the valve $r$ by means of the lever $l$ the cylinders are connected up with either the pressure pipe $v$ or the release pipe $w$. On admitting the pressure to the cylinders, the piston $m$ moves upward while the piston $m^1$ moves downward under exactly the same pressure, thus contracting the brake shoes as required.

It will be seen that the adjustment required to compensate for the wear of the brake shoes—which is accomplished by means of right and left handed nuts $e^1$ of the adjustable links $e$—does not alter the relative position of the bell-crank levers, and further, the positions of the pistons vary but slightly even when the brake shoes become worn out. This is of special advantage in arranging the parts, levers, release springs, and the like, as it allows for considerable leverage between the long and short arm of the bell-crank levers without the necessity of an exceptionally long cylinder, which would be the case if the wear on the brake shoes affected the position of the piston in the cylinder.

This invention is particularly suitable for use with the mechanism employed to operate epicyclic change speed gearing on account of its not causing a side thrust on the shaft carrying the brake drums, etc., and also by reason of the ease of control which it gives.

What I claim as my invention, and desire to secure by Letters Patent is:—

1. A brake mechanism comprising brake shoes each having one end pivotally mounted, and independent means connected with the free end of each of the brake shoes for independently and simultaneously actuating them to bind the object they act upon.

2. A brake mechanism comprising brake shoes each having one end pivotally mounted upon a base, and independent fluid actuated means connected with the free end of each of the brake shoes for independently and simultaneously actuating them toward a point midway thereof to provide for uniform binding action upon the object acted upon.

3. A brake mechanism comprising brake shoes each having their radially opposed ends pivotally mounted upon a base, independent fluid actuated means, deriving power from a common source, connected with the free end of each of the brake shoes for independently and simultaneously actuating them toward a point midway thereof to provide for uniform binding action upon the object acted upon and means connected with the first named means and pivotally mounted upon a base for compensating for the wear of the brake shoes.

4. A brake mechanism comprising a pair of diametrically opposed identical brake shoes each having their radially opposed ends pivotally mounted upon a base, independent fluid actuated reversely moving means, deriving power from a common source, connected with the free end of each of the brake shoes for independently and simultaneously actuating them toward a point midway the two to provide for uniform binding action upon the object acted upon and means connected with the first named means and pivotally mounted upon a base for compensating for the wear of the brake shoes.

5. A brake mechanism comprising a pair of diametrically opposed identical brake shoes each having their radially opposed ends pivotally mounted upon a base, independent fluid actuated reversely moving means, deriving power from a common source, connected with the free end of each of the brake shoes for simultaneously actuating them toward a point midway the two to provide for uniform binding action upon the object acted upon, said means comprising, means for compensating for the wear of said brake shoes, and bell crank levers included in said actuating means and having connection with both the free ends of the brake shoe and the compensating means whereby to co-act with said actuating means and said compensating means to maintain an association between the two to compensate for brake shoe wear and to adjust the shoes relatively to each other.

In testimony whereof I have signed my name in the presence of two subscribing witnesses.

FREDERICK HENRY ROYCE.

Witnesses:
   Constance Poppleton,
   Maurice Olley.